METHOD OF MAKING MAGNETIC FERRITE SHEET WITH IMBEDDED CONDUCTORS

Filed June 11, 1962

INVENTOR.
ROBERT L. NOACK
BY
Carl V. Olson
Attorney

United States Patent Office 3,247,573

Patented Apr. 26, 1966

3,247,573

METHOD OF MAKING MAGNETIC FERRITE SHEET WITH EMBEDDED CONDUCTORS

Robert L. Noack, Neshanic, N.J., assignor to Radio Corporation of America, a corporation of Delaware Filed June 11, 1962, Ser. No. 201,626
9 Claims. (Cl. 29—155.5)

Figures 1, 2, 3, 4, 5, 6:
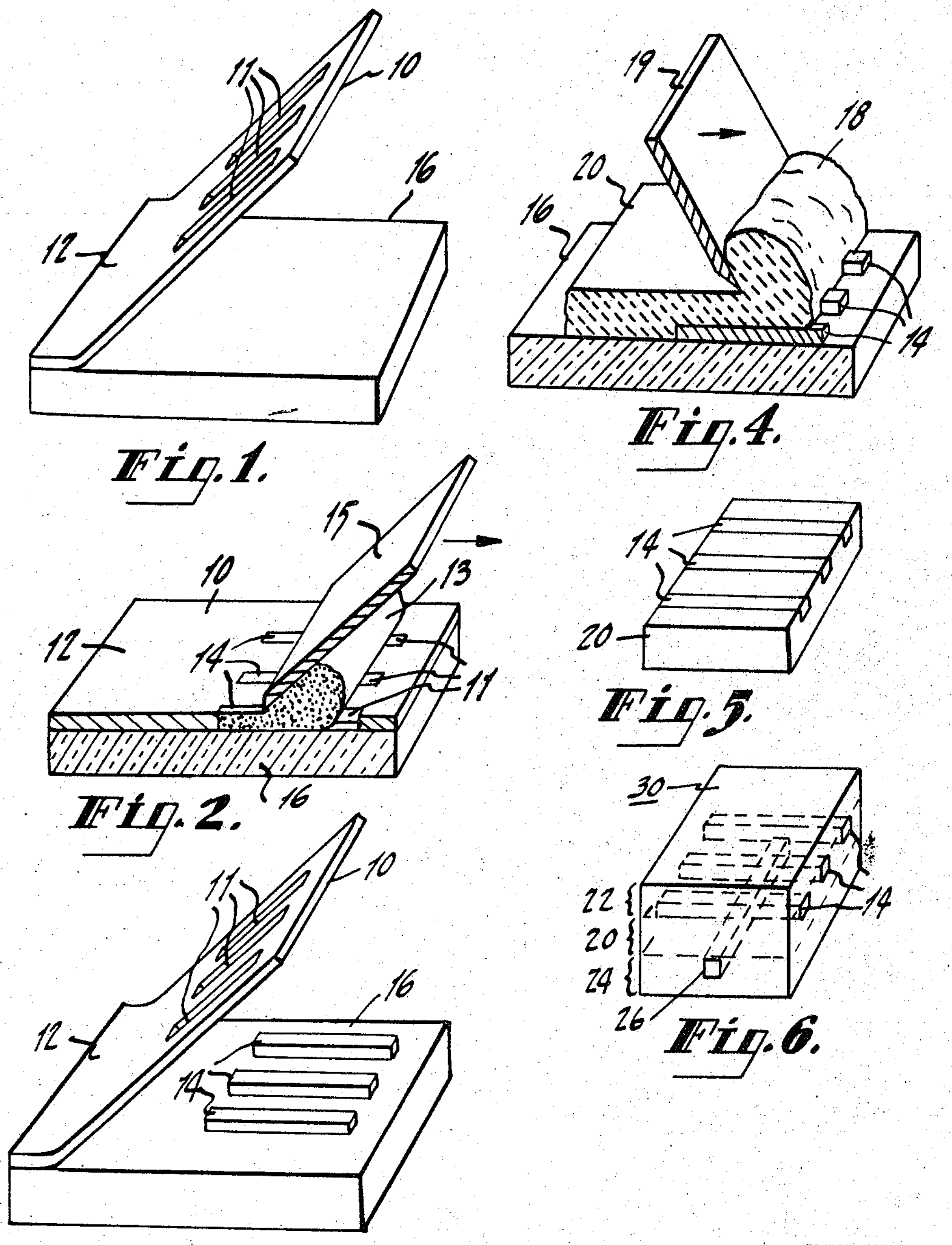

This invention relates to articles of insulating material with imbedded conductors, particularly to such articles in which the insulating material is sintered magnetic ferrite, and to methods of making the articles. While not limited thereto, the invention is particularly useful in the construction of magnetic memories for use in electronic data processing equipment.

Magnetic memory element arrays presently enjoying widespread commercial use are in the form of rows and columns of ferrite magnetic cores which have been manually threaded with row and column conductors. There is a demand for magnetic memory arrays which are faster in operation by virtue of having smaller magnetic memory elements that can be wired by hand. A magnetic memory array capable of automated fabrication is also less expensive to construct in commercial quantities.

It has been proposed to construct an array of magnetic memory elements by forming thin sheets of green ferrite, printing conductive patterns on the sheets, laminating a plurality of such sheets with the conductive patterns in a desired registry and firing the lamination to provide a unitary homogeneous sintered ferrite sheet having a desired two-state magnetic characteristic. The imbedded conductors cooperate with surrounding ferrite to constitute memory elements that are addressable for the writing in and reading out of digital information.

It is a general object of this invention to provide an improved method of making a sintered sheet of uniform, homogeneous void-free insulating material (such as magnetic ferrite) having accurately and uniformly dimensioned and spaced electrical conductors imbedded therein.

It is another object of this invention to provide an improved method of making a sheet of insulating material having a uniform thickness and having electrical conductors imbedded therein flush with one surface thereof.

It is a further object of this invention to provide a method of making a sheet of green ferrite, having flush imbedded conductors, which can be laminated and sintered without developing faults, cracks or voids.

It is yet another object to provide an improved article of manufacture consisting of a sheet of insulating material such as green ferrite having flush imbedded conductors therein.

According to one specific example of the invention, a sheet of uniform homogeneous sintered ferrite having imbedded conductors is constructed by the steps of: fixing a sheet metal stencil on a glass substrate, applying a conductive paste including a conductive powder and a vehicle through the stencil to the substrate with a spatula, the conductive powder being selected from the class including palladium, platinum, rhodium, rhenium and alloys thereof, the vehicle being a material such as automotive grease which adheres to the glass substrate but not to the stencil, removing the stencil from the substrate leaving a pattern of conductive paste conductors on the substrate, washing away at least a portion of the vehicle in the conductive paste conductors, doctor blading a green ferrite slurry over the pattern of conductors on the substrate, solidifying the doctor bladed ferrite slurry by drying, and removing the doctor bladed ferrite and imbedded conductors from the substrate. A plurality of such green ferrite sheets may be integrated by pressure laminating and firing the lamination to sinter the ferrite.

These and other objects and aspects of the invention will be apparent to those skilled in the art from the following more detailed description taken in conjunction with the appended drawing, wherein:

FIGURES 1 through 6 illustrate successive steps of a method according to the teachings of the invention.

Referring now in greater detail to the drawing, FIGURE 1 shows a sheet metal stencil 10 having a thickness equal to or greater than the thickness of the desired conductors and provided with openings 11 having the width and the pattern of the desired conductors. One edge 12 of the stencil 10 is fixed temporarily or permanently to a smooth substrate 16 which may be glass. Beryllium copper is a prefrred material for the stencil 10 because it has considerable strength and flexibility even in very thin sheets having a thickness of one or a few milli-inches.

The openings 11 in the stencil 10 are preferably etched through by employing the well-known photoresist process. This process involves the application of an unexposed photoresist material (one suitable type is known in the trade as "KPR" and sold by Eastman Kodak Company) on the blank stencil sheet, optically exposing portions of the photoresist with a pattern corresponding to the desired conductors, chemically developing the exposed photoresist, and dissolving away the unexposed photoresist to leave the photoresist plastic covering the metal stencil sheet except where openings are desired. The exposed portions of the stencil sheet are then etched through by a suitable etchant. If the stencil sheet is copper, the etchant may be ammonium persulfate, chromic acid or copper chloride. The etching is done from one side of the stencil sheet so that the openings have tapered walls, the openings being slightly wider at the bottom surface of the stencil 10 of FIGURE 1 than at the top surface to facilitate a subsequent step of the process.

The photoresist process, being an optical and chemical process, permits the construction of a stencil 10 having openings 11 which are extremely small and accurately and uniformly dimensioned. The openings 11, corresponding with desired conductors, may be from one to three milli-inches in transverse dimensions and may be spaced apart from each other uniformly by amounts in the range of from about five to ten milli-inches.

The stencil 10, as shown in FIGURE 1, is formed and mounted by an edge 12 on the substrate 16 in such a way that the main portion of the stencil is normally separated from the substrate, but can be pressed into smooth contact with the substrate. This quality of the stencil 10 is easily achieved if the stencil is made of a material such as beryllium copper.

FIGURE 2 illustrates the applying of a paste 13 of a conductive powder and a vehicle through the openings 11 in the stencil 10 into contact with the substrate by means of a spatula 15. The conductive powder should have a particle size much less than the minimum dimension of an opening 11 in the stencil. The spatula 15 may, for example, be a razor blade, or any other suitable blade having a smooth straight edge suitable for being drawn across the top surface of the stencil 10. The spatula 15 is initially applied to the stencil 10 near the fixed edge 12 with a charge of the paste 13, and the spatula is drawn across the stencil forcing the stencil into smooth engagement with the substrate 16. At the same time, the conductive paste 13 is drawn across the top surface of the stencil 10 by the spatula 15 and is forced into the openings 11 in the stencil. The spatula 15 carries all excess paste 13 off beyond the edge of the stencil 10 leaving the openings 11 filled flush with the top of the stencil. All other paste 13 is scraped from the top of the stencil. As the spatula 15 passes off the edge of the stencil 10, the stencil resiliently springs back up to its normal position, as shown in FIGURE 3, leaving the desired pattern of conductive paste conductors 14 on the substrate 16.

The conductive paste 13 includes a conductive powder in a vehicle having a desired amount of rigidity or body, and having the characteristic of adhering more firmly to the substrate 16 than to the walls of the openings 11 in the stencil 10. If the substrate 16 is glass, and the stencil 10 is copper, a suitable vehicle is automotive grease. The grease may constitute about 20 or 25 percent by weight of the paste. Another desired characteristic of the vehicle is that it is not dissolved completely by the solvent employed in the ferrite slurry 18 in the following step of the process. These ferrite slurries normally include methyl ethyl ketone as a solvent. Automotive grease is only slightly or slowly dissolved by methyl ethyl ketone. Other suitable vehicles may be employed. The separation of the stencil 10 from the paste conductors 14 is facilitated by the tapered walls of the openings 11, as has been described above in connection with the etching of the stencil 10.

The conductive powder in the paste 13 is preferably selected from the class including palladium, platinum, rhodium and rhenium, or alloys including these elements, because these conductive materials have a sufficiently high melting point to withstand a final step in the process which will be described in connection with FIGURE 6.

A portion of the vehicle of the paste conductor 14 in FIGURE 3 may be removed with a suitable solvent. If the vehicle is automotive grease, the solvent may be gasoline or acetone, the amount of grease removed being dependent on the period of time that the paste conductors are exposed to the solvent. The removal of some of the vehicle of the paste conductors 14 will somewhat reduce their thickness. This is compensated for by making the stencil 10 sufficiently thicker to compensate for shrinkage resulting from the removal of some of the vehicle, and also to compensate for the shrinkage that results in the firing process to the described.

FIGURE 4 shows the following step in the process wherein the stencil 10 has been removed from the substrate 16 (if it is not already sufficiently out of the way), and a slurry 18 of insulating material such as ferrite is doctor bladed over the paste conductors 14 by means of a doctor blade 19. The resulting green ferrite sheet 20 with flush imbedded paste conductors 14 is uniformly and accurately dimensioned in thickness.

By way of example, the ferrite slurry may be made in the proportions of 65 grams of a calcinated ferrite made of zinc, magnesium and manganese oxides, 13 grams of an organic binder (one suitable form of binder is sold under the trade name "VYNS" by the Union Carbide Corporation) and 52 grams of a solvent such as methyl ethyl ketone. The materials are milled in a ball mill and additional solvent is added to achieve a viscosity of about 900 centipoises, which is suitable for doctor bladed purposes.

The thickness of the resulting doctor bladed green ferrite sheet 20 may be, for example, in the range of from one-half milli-inch to ten milli-inches. The green ferrite slurry 18 flows freely into the corners between the conductors 14 and the conductive sheet 10 so that there are no voids in the resulting doctor bladed sheet. After drying for about five minutes, the ferrite slurry solidifies and becomes a thin flexible leather-like sheet 20 of solidified green ferrite having imbedded conductors 14.

The green ferrite sheet 20 having a uniform accurately-dimensioned thickness may be created over the conductors 14 by means other than the doctor blade 10, such as by means of a calendering roll, or by means of a spray gun.

The dried green ferrite 20 with imbedded conductive paste conductors 14 is peeled from the substrate 16 and trimmed around the edges to provide the article shown in FIGURE 5. The green ferrite slurry 18 flows so intimately around the paste conductors 14 in the step of FIGURE 4 that the ferrite, when dried, firmly grips the paste conductors and removes them from the substrate 16 when the green ferrite sheet 20 is peeled therefrom.

The green ferrite sheet 20 with imbedded conductors 14, as shown in FIGURE 5, differs from similar sheets formed by prior art methods in that the conductors 14 and imbedded in the green ferrite and have one surface prefectly flush with a surface of the green ferrite sheet 20. The prior art method involves the doctor blading of a green ferrite sheet, and then the deposition of conductors on top of, and protruding from, a surface of the ferrite sheet. According to the present invention, the two major parallel surfaces of the green ferrite sheet 20 are perfectly smooth and parallel. As such, the sheet is adapted to be laminated with other similar sheets without any danger of irregularities in the contacting surfaces.

FIGURE 6 illustratives a final product resulting from pressure laminating the green ferrite sheet 20 having imbedded conductors 14 with an upper green ferrite sheet 22 not having any conductors imbedded therein, and a lower green ferrite sheet 24 having one conductor 26 imbedded therein. Lamination is accomplished with a pressure of about 900 pounds per square inch for about 10 minutes at a temperature of about 120° C. This laminating temperature is not high enough to cause a sintering of the ferrite, but is sufficiently high to facilitate a physical bonding of the separate sheets.

The pressure laminated green ferrite sheet is subjected to a temperature in the range of from 200 to 400° C. to burn out the binders, and then to a temperature which is sufficiently high to sinter the green ferrite and cause it to assume the desired magnetic properties. The sintering temperature of most suitable ferrites is known and is about 1200° C. After sintering, the sheet may be air quenched at room temperature and/or may be subsequently annealed in nitrogen at a temperature of 1100° C. for an hour. The foregoing is merely illustrative; the particular ferrite composition employed should be given the known heat treatment appropriate for producing the desired electro-magnetic characteristics.

The heat treatment results in a shrinking of the ferrite by an amount such as from 5 to 30%. The heat treatment, in driving off the remaining vehicle (grease) of the paste conductors, also results in a shrinkage of the paste conductors. The proportion of vehicle left in the paste conductors prior to the heat treatment is selected so that the shrinkage of the paste conductors is not greater than, and preferably is somewhat less than, the shrinkage of the surrounding ferrite. This results in a compacting of the conductive particles by the ferrite so that the particles are forced into intimate contact to form a good electrical conductor. Another result is the avoidance of any air spaces which would, if present, interfere with the uniformity of the electro-magnetic characteristics of the resulting memory elements.

The final product of the method or process as illustrated in FIGURE 6 consists of a sintered magnetic ferrite sheet 30 having imbedded conductors 14 and 26. The ferrite 30 is uniform, homogeneous and free from any voids or cracks near the conductors 14 and 26. The conductors 14 and 26 have the desired high dimensional and locational accuracy. The spacing between the imbedded conductor 26 and the three conductors 14 is uniform and determined by the accuracy with which the thickness of the doctor bladed sheet 20 in FIGURE 4 is created by the doctor blading process.

The physical relationship of the imbedded conductors 14 and 26 in FIGURE 6 is simplified, since the primary purpose of the drawing is to illustrate the method. Three individual memory elements for the magnetic storage of digital information are constituted by the three crossovers of the conductors 14 with the conductor 26, and the ferrite magnetic material immediately surrounding the three crossovers. Alternatively, the conductor 26 may include portions which extend parallel with each of the three conductors 14 to increase the cooperative magnetic effects of electric currents in the four conductors. Other more complex physical arrangements may be used. A large number of conductors and memory elements will normally be provided in each sintered ferrite sheet 30.

It is thus apparent that the method of this invention permits the construction by automated techniques of large arrays of magnetic memory elements with the necessary degree of dimensional and electro-magnetic uniformity, the individual memory elements being smaller than can be fabricated manually.

What is claimed is:

1. The method of forming a sheet of green ferrite having conductive paste conductors imbedded flush with one surface thereof, comprising the steps of
   depositing the desired conductive paste conductors on a smooth surface,
   laying a slurry of ferrite over the conductive paste conductors and the smooth surface,
   solidifying the ferrite slurry, and
   separating the solidified ferrite and the imbedded conductive paste conductors from said smooth surface.

2. The method of forming a sheet of sintered ferrite magnetic material having conductors imbedded therein, comprising the steps of
   depositing conductive paste conductors of a vehicle and a material selected from the class consisting of palladium, platinum, rhodium and rhenium and alloys thereof on a smooth surface,
   laying a ferrite slurry over the conductors and the smooth surface,
   solidifying the ferrite slurry,
   separating the solidified ferrite and the imbedded conductors from said smooth surface, and
   firing the ferrite and imbedded conductors to remove said vehicle and sinter the ferrite.

3. The method of forming a sheet of sintered ferrite magnetic material having conductors imbedded therein, comprising the steps of
   depositing conductive paste conductors of a vehicle and a material selected from the class consisting of palladium, platinum, rhodium and rhenium and alloys thereof on a smooth surface,
   laying a ferrite slurry over the conductors and the smooth surface,
   solidifying the ferrite slurry to form a solidified green ferrite sheet,
   separating the solidified green ferrite sheet and the imbedded conductors therein from said smooth surface,
   forming a second solidified green ferrite sheet,
   laminating said solidified green ferrite sheets, and
   firing the lamination to remove said vehicle and to sinter the ferrite.

4. The method of forming a sheet of green ferrite having conductors imbedded therein flush with one surface thereof, comprising the steps of
   applying a paste consisting essentially of conductive powder and vehicle through a stencil to a substrate with a spatula which pushes the paste through the stencil to the substrate, said vehicle being one which adheres to said substrate but not to said stencil,
   removing said stencil from said substrate leaving a pattern of paste conductors,
   laying a ferrite slurry over the conductors on the substrate,
   solidifying the ferrite by drying, and
   removing the solidified ferrite and imbedded conductors from said substrate.

5. The method of forming a sheet of uniform homogeneous sintered ferrite having imbedded conductors, comprising the steps of
   applying a paste consisting essentially of a conductive powder and a vehicle through a stencil to a substrate, said vehicle being selected to adhere to said substrate but not to said stencil,
   removing said stencil from said substrate leaving a pattern of paste conductors on said substrate,
   laying a green ferrite slurry over the pattern of conductors on the substrate,
   solidifying the ferrite slurry by drying,
   removing the solidified ferrite and imbedded conductors from said substrate,
   pressure laminating a plurality of such green ferrite sheets, and
   firing the lamination to remove said vehicle and to sinter the ferrite.

6. The method of forming a sheet of uniform homogeneous sintered ferrite having imbedded conductors, comprising the steps of
   applying a conductive paste consisting essentially of a conductive powder and a vehicle through a stencil to a substrate, said conductive powder being selected from the class consisting of palladium, platinum, rhodium and rhenium and alloys thereof, said vehicle being selected to adhere to said substrate but not to said stencil,
   removing said stencil from said substrate leaving a pattern of paste conductors on said substrate,
   doctor blading a green ferrite slurry over the pattern of conductors on the substrate,
   solidifying the doctor bladed ferrite slurry by drying,
   removing the doctor bladed ferrite and imbedded conductors from said substrate,
   pressure laminating a plurality of such green ferrite sheets, and
   firing the lamination to remove said vehicle and to sinter the ferrite.

7. The method of forming a sheet of uniform homogeneous sintered ferrite having imbedded conductors, comprising the steps of
   etching a sheet metal stencil with openings having the pattern of the desired conductors,
   fixing said stencil on a glass substrate,
   applying a conductive paste consisting essentially of a conductive powder and a vehicle through said stencil to said substrate with a spatula, said conductive powder being selected from the class consisting of palladium, platinum, rhodium and rhenium and alloys thereof, said vehicle being a grease such as automotive grease which adheres to said glass substrate but not to said stencil, removing said stencil from said substrate leaving a pattern of conductive paste conductors on said substrate,
   washing away at least a portion of the vehicle in said conductive paste conductors,
   applying a green ferrite slurry over the pattern of conductors on the substrate,
   solidifying the ferrite slurry by drying,
   removing the ferrite and imbedded conductors from said substrate,
   pressure laminating a plurality of such green ferrite sheets, and
   firing the lamination to remove any of said vehicle remaining and to sinter the ferrite.

8. The method of forming a sheet of uniform homogeneous sintered ferrite having imbedded conductors, comprising the steps of
   etching a sheet metal stencil with openings having the pattern of the desired conductors,
   hingedly fixing an edge of said stencil to a glass substrate in such a way that the main portion of the stencil is normally separated from the substrate but can be pressed into smooth contact therewith,
   applying a paste of conductive powder and vehicle through said stencil to said substrate with a spatula which pushes the stencil into contact with the substrate and pushes the mixture through the stencil to the substrate, said conductive powder being selected from the class consisting of palladium, platinum, rhodium and rhenium, said vehicle being a grease such as automotive grease which adheres to said glass substrate but not to said stencil, whereby the paste sticks to the substrate when said spatula is removed and permits the stencil to spring up away from the substrate, washing away at least a portion of said vehicle leaving conductors in the form of said conductive powder in the desired pattern on the substrate, doctor blading a green ferrite slurry over the conductors on the substrate, solidifying the doctor bladed ferrite slurry by drying, removing the doctor bladed ferrite and imbedded conductors from said substrate, pressure laminating a plurality of such green ferrite sheets, and firing the lamination to remove any of said vehicle remaining and to sinter the ferrite.

9. The method of forming a sheet of uniform homogeneous sintered ferrite having imbedded conductors, comprising the steps of mounting a stencil in relation to a substrate in such a way that the stencil is normally separated from the substrate but can be pressed into contact therewith, applying a paste of conductive powder and vehicle through said stencil to said substrate with a spatula which pushes the stencil into contact with the substrate and pushes the paste through the stencil to the substrate, said vehicle being one which adheres to said substrate but not to said stencil, whereby the paste sticks to the substrate when the spatula is removed to permit the stencil to spring up away from the substrate, laying a ferrite slurry over the conductors on the substrate, solidifying the ferrite by drying, removing the ferrite and imbedded conductors from the substrate, pressure laminating a plurality of such green ferrite sheets, and firing the lamination to remove said vehicle and to sinter the ferrite.

References Cited by the Examiner

UNITED STATES PATENTS

| | | | |
|---|---|---|---|
| 421,561 | 2/1890 | Davis | 101—126 |
| 2,444,860 | 7/1948 | Summer | 101—115 |
| 2,542,726 | 2/1951 | Sullivan | 101—127 X |
| 2,934,748 | 4/1960 | Steimen | 340—174 |
| 2,970,296 | 1/1961 | Horton | 340—174 |
| 2,985,948 | 5/1961 | Peters | 29—155.5 |
| 3,005,739 | 10/1961 | Long et al. | 156—47 |
| 3,040,301 | 6/1962 | Howatt et al. | |
| 3,068,554 | 12/1962 | Pouget | 29—155.5 |
| 3,077,021 | 2/1963 | Brownlow | 29—155.5 X |
| 3,085,295 | 4/1963 | Pizzino et al. | |
| 3,099,874 | 8/1963 | Schweizerhof | 29—155.5 |
| 3,115,432 | 12/1963 | O'Neill et al. | 156—47 |
| 3,149,408 | 9/1964 | Falk et al. | 29—155.6 |
| 3,163,922 | 1/1965 | Brailowsky | 29—155.6 |

WHITMORE A. WILTZ, *Primary Examiner.*

BERNARD KONICK, JOHN F. CAMPBELL, *Examiners.*

J. W. MOFFITT, P. M. COHEN, *Assistant Examiners.*